United States Patent [19]

Kobayashi et al.

[11] Patent Number: 4,640,150
[45] Date of Patent: Feb. 3, 1987

[54] STEERING WHEEL WITH INTEGRALLY-SKINNED FOAMED THERMOPLASTIC RESIN-COVERED HANDWHEEL CORE HAVING FLOW MARK-OBSCURING ABRASION-RESISTANT COATING

[75] Inventors: Teruo Kobayashi, Inazawa; Sadao Uchida, Ichinomiya, both of Japan

[73] Assignee: Toyoda Gosei Co., Ltd., Nishikasugai, Japan

[21] Appl. No.: 681,662

[22] Filed: Dec. 14, 1984

[30] Foreign Application Priority Data

Dec. 14, 1983 [JP] Japan .................. 58-235727

[51] Int. Cl.⁴ .............................................. B62D 1/04
[52] U.S. Cl. ........................................ 74/552; 74/558; 264/45.5; 264/46.7; 264/46.9; 264/129; 264/DIG. 83
[58] Field of Search ............... 74/558, 552; 264/46.4, 264/46.7, 46.9, 127, 45.5, 130, DIG. 14, 129, DIG. 83; 428/422, 446

[56] References Cited

U.S. PATENT DOCUMENTS

| 3,802,291 | 4/1974 | Young, Jr. et al. | 74/558 |
| 4,118,455 | 10/1978 | Byrn | 74/558 |
| 4,201,830 | 5/1980 | Wollen | 428/375 |
| 4,353,266 | 10/1982 | Grothe | 74/552 |
| 4,454,088 | 6/1984 | White | 264/127 |
| 4,522,084 | 6/1985 | Takimoto et al. | 74/558 |

FOREIGN PATENT DOCUMENTS 1186027  4/1970  United Kingdom .

Primary Examiner—Donald Czaja
Assistant Examiner—Jennifer Cabaniss
Attorney, Agent, or Firm—Cushman, Darby & Cushman

[57] ABSTRACT

A steering wheel having the hand wheel part thereof formed of an injection molded foam of thermoplastic synthetic resin, which injection molded foam has a substantially solid outer surface and is covered with a coating. This steering wheel is produced in attractive appearance without requiring use of any specially formulated resin material or exercise of rigid control of molding conditions.

5 Claims, 3 Drawing Figures

STEERING WHEEL WITH INTEGRALLY-SKINNED FOAMED THERMOPLASTIC RESIN-COVERED HANDWHEEL CORE HAVING FLOW MARK-OBSCURING ABRASION-RESISTANT COATING

BACKGROUND OF THE INVENTION

1. Field of the Invention

This invention relates to a steering wheel the hand wheel part of which is made of injection molded foam of thermoplastic synthetic resin. This steering wheel is intended mainly for use in an automobile.

2. Description of the Prior Art

The desirability of the appearance of steering wheels of the type described above in the market has been finding growing recognition because these steering wheels promise improvement in producibility (quantity production), reduction in production cost, and decrease of weight. Various inventions have been proposed which are directed to steering wheels made of integral skin type (solid surface) injection molded foam of flexible PVC. In the production of such steering wheels, PVC materials of special formulations (ordinary PVC materials are liable to produce flow marks) must be used and, at the same time, the molding conditions such as temperatures of materials and metal dies and periods of die closure must be rigidly controlled in order that the flexible PVC materials may produce flawless solid surfaces by being foamed at prescribed expansion ratios (1.1 to 1.8 times the original volume). These rigid conditions of material formlation and foaming operation have resulted in increased material cost and decreased producibility.

SUMMARY OF THE INVENTION

The steering wheel of this invention has the hand wheel part thereof made of injection molded foam of thermoplastic synthetic resin. The surface of the injection molded foam is substantially in a solid state and is covered with a coating. The steering wheel of this invention, therefore, can be produced in attractive appearance without requiring use of a foaming material of special formulation or exacting control of molding conditions. Further since the appearance of this steering wheel can be freely selected because of the coating, the steering wheel is enabled to acquire rich hand and ample design and full luxuriousness.

DESCRIPTION OF THE PREFERRED EMBODIMENT

Figure 1:
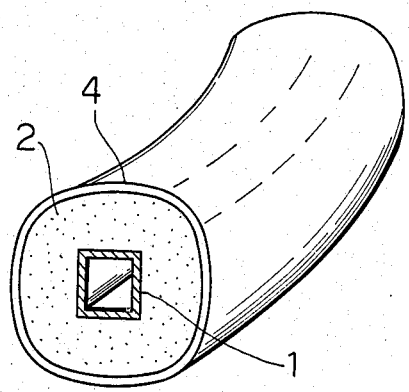
FIG. 1 is a perspective view of a segment cut from the hand wheel part of a steering wheel of this invention.

The hand wheel part of a steering wheel which envelopes a rim core 1 is formed of an injection molded foam 2 of thermoplastic synthetic resin and has substantially solid inner and outer surface layers and has the outer surface thereof covered with a coating 4 as illustrated in FIG. 1.

Although the thermoplastic resin which is foamed to produce the hand wheel part may be of a rigid grade, it is generally desired to be of a flexible grade from the standpoint of feeling of touch. Besides the aforementioned flexible PVC, various general-purpose plastic elastomers such as, for example, polyolefin type, polystyrene type, PVC type, and 1, 2-polybutadiene type thermoplastic resins are available as the raw material. Where the material cost does not matter much, engineering plastic thermoplastic elastomers of the urethane type, polyester type, polyamide type, and ionomer type are also available. Such a thermoplastic synthetic resin is used as mixed with an organic foaming agent, optionally in conjunction with other auxiliary materials. Examples of the organic foaming agent effectively usable in the case of PVC include azo-dicarbonamide (ADCA), azo-bis-isobutylonitrile, diazoaminobenzole, azo-hexahydrobenzonitrile, benzene-sulfonyl hydrazine, and dinitroso-N,N'-dimethyl terephthalamide.

For the purpose of this invention, the thermoplastic resin material is not required to be prepared in any special formulation and the molding conditions are not required to be rigidly controlled because the aforementioned injection molded foam is simply required to have a generally solid outer surface. The inner surface of the injection molded foam is in a substantially solid state because of the adhesiveness with the core 1. This substantially solid inner surface is not a requisite where the hand wheel part is made wholly of resin and contains no core or where the thermoplastic synthetic resin is of a rigid grade. The injection molded foam is produced at an expansion ratio of 1.1 to 1.8 times the original volume. If the expansion ratio is less than 1.1 times, the foaming fails to bring about the desired effect of decreasing the weight of the produced steering wheel. If the expansion ratio exceed 1.8 times, the produced foam acquires a generally solid outer face with difficulty and the outer texture of the foam is so coarse as not to be effectively covered with the coating.

The coating 4 is formed by applying on the surface of the injection molded foam a coating material excelling in wear resistance and flexibility, the properties generally demanded on the surface of the hand wheel part of any steering wheel, by suitable means such as brushing, spraying or immersion and subsequently drying (and optionally heating) the applied layer of coating material. The thickness of this coating is in the range of 10 to 40 $\mu$m where the substrate (the injection molded foam) is made of PVC. If this thickness is less than 10 $\mu$m, the coating can neither hide the surface defect (such as flow mark) of the injection molded foam nor offer ample wear resistance. If the thickness exceeds 40 $\mu$m, the excess thickness does not go to increase the aforementioned improvement any further but increases the cost of coating. The substrate (the injection molded foam), before the application of the coating, is subjected to a treatment for surface activation when necessary, particularly in the case of a polyolefin type resin, besides an ordinary treatment of cleaning.

An urethane type coating material proves particularly desirable in the sense that this coating material excels in wear resistance and flexibility.

Figure 2:
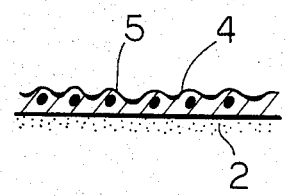
FIG. 2 is a model cross section illustrating the mode of a coating applied on the surface of the hand wheel part of the steering wheel of this invention.

The coating material, during the course of its application to the substrate, is desired to incorporate therein a powdery lubricant of the same or different color. This addition of the lubricant serves to enhance further the wear resistance of the produced coating. This is because the lubricant 5 exposes itself partly through the surface of the coating 4 and, thus, contributes to lowering the frictional coefficient of the surface (FIG. 2). Examples of the powdery lubricant usable advantageously for this purpose include fluorine resin powder and silicone resin powder. The particle diameter of the powdery lubricant is in the range of 5 to 50 μm. The amount of the lubricant to be added is generally in the range of 10 to 100 parts by weight based on 100 parts by weight of the vehicle of the coating material. If the amount of the added lubricant is less than 10 parts by weight, the addition itself proves ineffective. If the amount exceeds 100 parts, the coating material is embrittled and deprived partly of adhesiveness and flexibility.

Now, the present invention will be described more specifically below with reference to working examples.

In the working examples and comparative experiments, a PVC foaming material of the following formulation (a) was foam molded under the following molding conditions (b) to produce a steering wheel. The surface of the steering wheel was cleaned. Then, a two-component curing type urethane coating material containing 40 parts by weight of fluorine resin powder (produced by Naito Shikki Kogeisha and marketed under trademark designation of "Naito-Alcon SS") was applied on the cleaned surface of the steering wheel by spraying in a varying thickness indicated in Table 1. The applied layer of the coating material was dried and cured at 80° C. for 20 minutes. The coatings obtained in the working examples assumed an appearance resembling suede owing to the presence of fluorine resin powder. They imparted luxuriousness to the producing steering wheels.

|  | parts by weight |
| --- | --- |
| (a) Formulation of foaming material | |
| PVC ($\bar{P}$ = 1050) | 100 |
| Plasticizer (DOP) | 80 |
| Inorganic filler (CaCo$_3$) | 20 |
| Stabilizer (metallic soap) | 3 |
| Foaming agent (ADCA) | 1 |
| (b) Molding conditions | |
| Die temperature | 40° C. |
| Core temperature | 20° C. |
| Injecting material temperature | 190° C. |
| Injection pressure | 50 kgf/cm$^2$ |
| Period of dye closure | 15 minutes |

Figure 3:
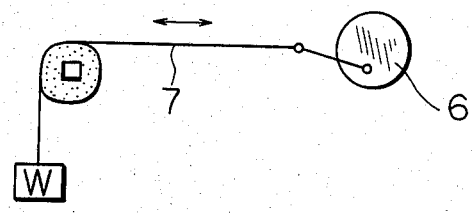
FIG. 3 is a model diagram illustrating a setup for testing the steering wheel for wear resistance.

The steering wheels obtained in the working examples and comparative experiments were tested for wear resistance and appearance (visual inspection). The test for wear resistance based on the principal illustrated in FIG. 3 (using a crank board 6) was carried out under the conditions of woven fabric of cotton as abrasive cloth 7, 1 kg of weight W, 12 cm of stroke, and 1 second per cycle. The results of the test are shown in Table 1.

TABLE 1

| | Thickness of coating (μm) | Wear resistance | Appearance (surface) |
| --- | --- | --- | --- |
| Comparative Experiment 1 | 0 | NG (appearance of discernible wear of PVC material) after 200 to 300 cycles of friction. | Heavy occurrence of flow mark |
| Comparative Experiment 2 | 3 | NG after 500 to 1000 cycles of friction. | Slight occurrences of flow mark |
| Comparative Experiment 3 | 4 | NG after 800 to 1200 cycles of friction. | Slight occurrences of flow mark |
| Example 1 | 10 | No sign of wear after 5 × 10$^5$ cycles of friction. | Good |
| Example 2 | 20 | No sign of wear after 5 × 10$^5$ cycles of friction. | Good |
| Example 3 | 30 | No sign of wear after 5 × 10$^5$ cycles of friction. | Good |

What is claimed is:

1. A steering wheel, comprising:
   a core, including a rim portion;
   a handwheel portion made of injection-molded foamed thermoplastic synthetic resin having an integral inner non-foamed, solid skin adhered to and enclosing said rim portion of said core, and having an integral outer non-foamed, solid skin;
   said foamed thermoplastic synthetic resin of said handwheel portion, between said integral inner and outer solid skins thereof, possessing an expansion ratio in the range of 1.1–1.8 compared with said thermoplastic synthetic resin when nonfoamed; and
   an abrasion-resistant coating adhered to and enclosing said outer skin of said handwheel portion, said coating being formed of a coating material containing a powdery lubricant in a coating material vehicle and being sufficiently thick as to substantially obscure from being seen or felt by hand any flow marks present on said outer solid skin.

2. A steering wheel according to claim 1, wherein said thermoplastic synthetic resin is flexible PVC and said coating has a thickness in the range of 10 to 40 μm.

3. A steering wheel according to claim 1, wherein said coating is formed of a urethane-type coating material vehicle.

4. A steering wheel according to claim 1, wherein said powdery lubricant has a particle diameter in the range of 5 to 50 μm and the amount of said powdery lubricant added to the coating material is in the range of 10 to 100 parts by weight based on 100 parts by weight of the coating material vehicle.

5. A steering wheel according to claim 1, wherein said powdery lubricant is fluorine resin powder or silicone resin powder.

* * * * *